United States Patent [19]

Jackson

[11] Patent Number: 5,325,626
[45] Date of Patent: Jul. 5, 1994

[54] FIRE ANT PESTICIDE DISPENSER APPARATUS

[76] Inventor: Robert L. Jackson, 856 Kirkland St., Batesburg, S.C. 29006

[21] Appl. No.: 69,167

[22] Filed: May 28, 1993

[51] Int. Cl.⁵ .............................................. A01M 1/20
[52] U.S. Cl. .................................... 43/124; 43/132.1; 239/271; 239/567
[58] Field of Search ............... 43/131, 124, 132.1; 47/79, 48.5; 239/271, 104, 288, 567; 222/185, 80, 540

[56] References Cited

U.S. PATENT DOCUMENTS

| | | | |
|---|---|---|---|
| 944,083 | 12/1909 | Francis | 43/124 |
| 1,106,679 | 8/1914 | Randell | 239/271 |
| 1,856,809 | 5/1932 | Gibson et al. | |
| 2,539,271 | 1/1951 | Rianda | 43/124 |
| 2,906,056 | 9/1959 | Youngblood | 43/124 |
| 3,550,542 | 12/1970 | Hollis | 111/95 |
| 4,160,336 | 7/1979 | Query et al. | 43/132 |
| 4,413,440 | 11/1983 | Schultz | 43/124 |
| 4,705,218 | 11/1987 | Daniels | 239/271 |
| 4,756,118 | 7/1988 | Evans, II | 43/132.1 |
| 5,054,231 | 10/1991 | Witherspoon | 43/124 |
| 5,109,629 | 5/1992 | King, Jr. et al. | 43/132.1 |
| 5,193,721 | 3/1993 | Gryder | 43/124 |

FOREIGN PATENT DOCUMENTS

| | | | |
|---|---|---|---|
| 946324 | 7/1956 | Fed. Rep. of Germany | 43/124 |
| 540070 | 7/1922 | France | 43/124 |

Primary Examiner—P. Austin Bradley
Assistant Examiner—Jeanne M. Elpel
Attorney, Agent, or Firm—Michael A. Mann

[57] ABSTRACT

A device for the eradication of fire ants includes a reservoir for the introduction of liquid insecticide, a conduit that transports liquid insecticide from the reservoir to a dispersion manifold, and a pointed tip to facilitate pushing the device into the ground. The manifold has a main passage in fluid communication with the interior of the conduit and a plurality of lateral holes in communication with the main passage that lead to the exterior surface of the manifold. The exterior surface of the manifold has an annular channel where the holes emerge from the manifold to space the holes apart from the dirt of the wall of the bore hole formed as the device is pushed into the ground. This gap helps to keep the holes free of dirt and soil particles so the pesticide can flow freely from the device. The reservoir is sized to hold an effective amount of insecticide, approximately one quart or more.

9 Claims, 1 Drawing Sheet

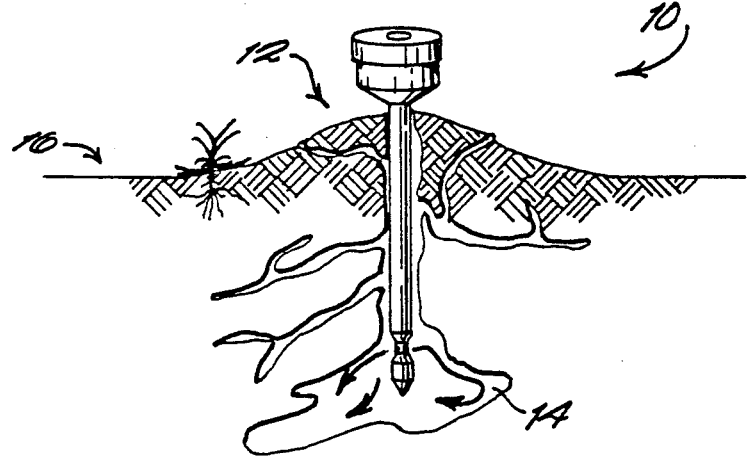
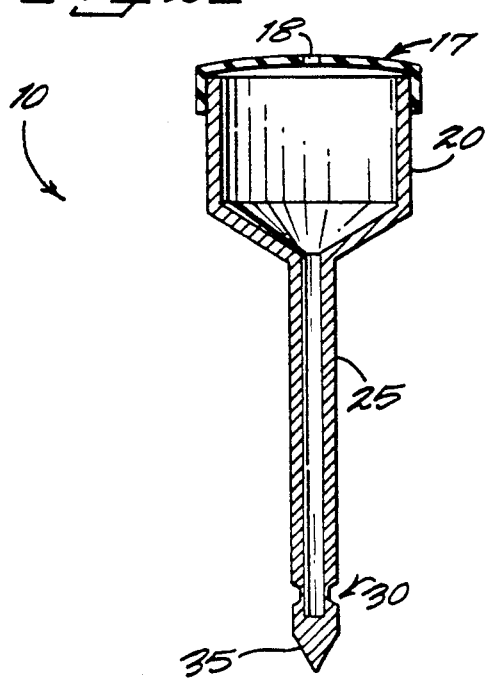
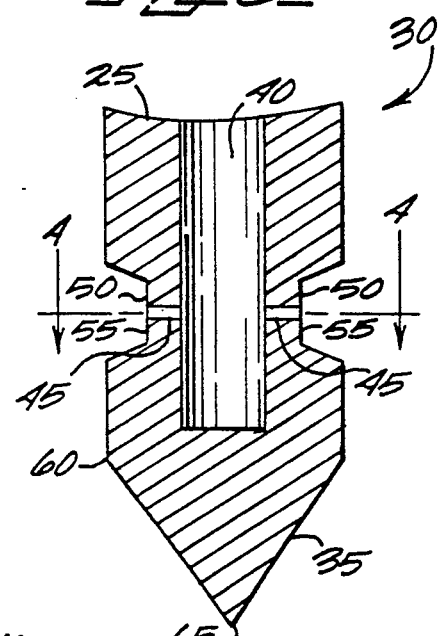
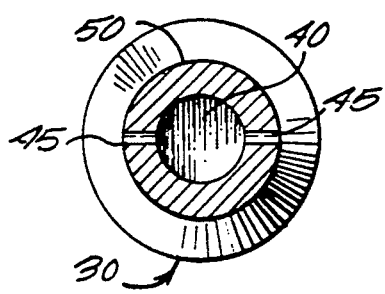

FIRE ANT PESTICIDE DISPENSER APPARATUS

BACKGROUND OF THE INVENTION

1. Field of the Invention

The present invention relates to a device for use in exterminating insect pests. More specifically, the invention relates to a device for dispersing a pesticide that kills fire ants.

2. Discussion of Background

Fire ant colonies are prevalent in the southeastern United States and pose a serious problem. A fire ant colony can be identified by a large crustaceous mound of earth. The presence of fire ant colonies in lawns and in parks is a nuisance and a hazard. The fire ant's painful sting, coupled with its tendency to attack in numbers, is a threat, especially to both children and small domestic animals.

Fire ants live below the surface of the ground where they form a network of tunnels. Their use of tunnels and their ability to quickly evacuate part of a colony from one part of the tunnel complex, makes the eradication of fire ants difficult.

A number of pesticides and devices for use with pesticides are available for killing fire ants. Usually, the pesticides are applied to the surface of the ground on a fire ant mound in the hopes that the ants will carry pesticides into the colony below. This approach is only marginally effective.

Recognizing the need to penetrate below the surface in order to effectively eradicate a fire ant colony, current devices for use with pesticides include a number of probes or lances that are inserted into the mound. For example, U.S. Pat. No. 5,109,629 issued to King et al teaches a device that introduces a vaporized pesticide into a fire ant colony via a probe. The probe is equipped with holes at one end through which the poison enters the fire ant colony. Similarly, U.S. Pat. No. 4,756,118 issued to Evans II discloses a pressurized injection gun having a lance with a tip through which liquid or vaporous poison can be forced into the colony.

Current devices are capable of delivering poison in a solid, liquid or vaporous state. Several of these heat liquid insecticides to form a vapor and thereafter introduce the vapor into the fire ant colony. Other apparatus introduce a combination of insecticide and other fluid into the fire ant colony. For example, U.S. Pat. No. 4,160,336 issued to Query combines an insecticide and a refrigerant for delivery into the fire ant colony via a probe.

Many of these designs are more suitable for professional use rather than for use by a homeowner; they are more complicated and involve high pressure and high or low temperatures. Furthermore, the simpler designs that might be suitable for home use do not address the problem of blockage of probe holes, blockage that occurs when soil becomes lodged in these holes. Typically, the lance or probe becomes blocked by soil as the device is pushed through the soil and into the fire ant colony. Blockage by soil prevents the effective eradication of a fire ant colony and limits the effectiveness of the device because fire ants respond to threat by either attacking the aggressor or by quickly evacuating the colony.

Given these conditions, there is a need for a simple, relatively inexpensive device, that can be used by a homeowner, and that is capable of quickly delivering liquid insecticide directly into a fire ant colony.

SUMMARY OF THE INVENTION

According to its major aspects and briefly described, the present invention is a device for use with an insecticide for the eradication of fire ants comprising a conduit with a reservoir at the one end, manifold for dispersing the insecticide attached to the other end of the conduit, and a pointed tip attached to the dispersing manifold. The device further comprises a dustcover containing an aperture. The manifold has a main passage and a plurality of lateral holes in fluid communication with the main passage and, in turn, with the interior of the conduit and through which the insecticide can flow. The dispersing manifold has an annular channel or "waist" where the holes penetrate its exterior surface and where the diameter of the manifold is smaller than the widest point of the pointed tip. Therefore, when the device is pushed, tip first, into the soil, it forms a cylindrical bore hole in the soil. The holes in the manifold are thus spaced apart from the wall of the bore hole by the annular channel and kept free of dirt and soil particles.

A major feature of the present invention is the exterior shape of the dispersing manifold and, in particular, the annular channel. By providing the channel, the holes of the manifold are spaced apart from the walls of the hole made when the present device is pushed into the ant mound and are thus kept free of dirt. Having the holes of the manifold clear, the liquid insecticide can flow from the reservoir, through the conduit, out through the lateral holes and into the ant colony quickly.

Another important feature of the present invention is the size of the reservoir. The reservoir is dimensioned to hold approximately one quart or more of insecticide. Approximately one quart is the minimum amount effective for eradicating a colony of fire ants.

Still another feature of the present invention is a combination of features of the device that lend themselves to be formed into a single, integrated device with no moving parts and that is easy—and quick—to use. The device can be made cheaply of, for example, polyvinyl chloride piping, which is washable and non-corrosive, and the device can be used by a homeowner with no special equipment.

Other features and advantages will be apparent to those skilled in the art of home insect pest control from a careful reading of the Detailed description of a preferred embodiment accompanied by the following drawings.

BRIEF DESCRIPTION OF THE DRAWINGS

In the drawings,

FIG. 1 is a perspective view of a device according to a preferred embodiment of the present invention, shown inserted into a fire ant colony in soil shown in cross section;

FIG. 2 is a cross-sectional view of a device according to a preferred embodiment of the present invention;

FIG. 3 is a detailed cross-sectional view of the device of FIG. 2, illustrating the manifold and tip; and FIG. 4 is a cross-sectional view taken along line 4—4 of FIG. 3

DETAILED DESCRIPTION OF A PREFERRED EMBODIMENT

The present invention is a device for use in killing fire ants. FIG. 1 shows the device in perspective and generally indicated by reference numeral 10, in position in the soil, which is shown in cross-section. Device 10 has been pushed through a fire ant mound 12 and its tip is in fire ant cavity 14.

Referring now to FIGS. 1 and 2, in a preferred embodiment, device 10 comprises a dustcover 17, a reservoir 20, a conduit 25, a dispersing manifold 30 and a hard, pointed tip 35. Reservoir 20 is in fluid communication with conduit 25 and receives the liquid insecticide. Dustcover 17 prevents device 10 from being clogged with foreign material and contains an aperture 18 to admit air so that insecticide can flow through conduit 25. Reservoir 20 has two functions: it is a fill point, being larger in diameter than conduit 25 so that pouring a liquid insecticide in reservoir 20 is easier than pouring directly into conduit 25; and reservoir 20 is a measuring device, dimensioned to hold an effective amount of insecticide so that the user of device 10 can pour a charge of insecticide into reservoir 20 that will effectively kill the fire ants in cavity 14.

An effective mount of fire ant insecticide has been found through experimentation to be approximately one quart or more. Preferably, reservoir 20 is dimensioned to hold approximately one quart of insecticide.

Conduit 25 transports insecticide from reservoir 20 to dispersion manifold 30. Manifold 30 serves to disperse the insecticide throughout cavity 14. As best seen in FIGS. 3 and 4, manifold 30 has a main passage 40 that is preferably coaxial with the interior of conduit 25, and has a plurality of lateral holes 45 from main passage 40 to an exterior surface 50 of manifold 30.

Manifold 30 has an annular channel 55 circling it at the point on exterior surface 50 where holes 45 are located so that holes 45 are found where manifold 30 has its minimum diameter or at least a diameter smaller than the largest diameter of pointed tip 35.

When device 10 is pushed into ant hill 12, pointed tip 35 first, it forms a cylindrical bore hole having a diameter as large as the largest diameter of device 10. Preferably, the largest diameter of device 10 is at a first end 60 of pointed tip 35 because tip 35 is tapered from first end 60 to second end 65 to form the point.

Channel 55 assures that there will be a gap between holes 45 and the inside of the cylindrical bore hole so that dirt and soil particles are kept away from holes 45. Thus annular channel 55 prevents holes 45 from becoming clogged.

It will be clear that as long as first end 60 of pointed tip 35 has a larger diameter that manifold 30, holes 45 will be spaced apart from the walls of the bore hole and will not be clogged. Therefore, an alternative design is to simply make manifold 30 of smaller diameter that tip 35 at its maximum diameter rather than form channel 55 in manifold 30. However, the channel is preferred in order to keep the length of holes 45 small, that is the distance from main passage 40 to exterior surface 50 should be short for better dispersion from device 10.

Pointed tip 35 is preferably solid, unlike conduit 25, because of the need for it to penetrate the crust that fire ants form on their mound 12. Preferably pointed tip 35 is made of a material that is non-corrosive and washable; device 10 is also preferably made of a non-corrosive, washable material such as polyvinyl chloride plastic, which is known to be suitable for in-ground use. Because of the inevitability of getting pesticides on device 10 and the likelihood of getting fire ants on at least the exterior surface 50 of device 10, being made of a non-corrosive, washable material is important.

In use and in the preferred embodiment, as shown in the drawings, pointed tip 35 is placed in contact with the colony's main entrance which exists at the top of fire ant mound 12. Device 10 is pushed, pointed tip 35 first, through mound 12. This penetration continues until there is little or no resistance against pointed tip 35, indicating that device 10 has entered fire ant cavity 14. Liquid insecticide is then poured into reservoir 20, at least approximately one quart. Dustcover 17 is then placed on reservoir 20. The insecticide travels from reservoir 20 through the interior of conduit 25 and into manifold 30. The insecticide then travels through main passage 40, through lateral holes 45 to exterior surface 50. Channel 55 assures that dirt and soil particles do not clog holes 45 and the weight of liquid insecticide can propel it out of manifold 30 into cavity 14.

The user, when the insecticide has run out of device 10, pulls it from the mound 12 and moves on to the next one. The use of device takes perhaps one minute, not long enough for significant activity by fire ants above or below the surface of the ground.

It will be apparent to those skilled in the art that many modifications and substitutions can be made to the preferred embodiment just described without departing from the spirit and scope of the invention as defined in the appended claims.

What is claimed is:

1. A device for use with an insecticide, said device consisting of:
    a hollow conduit having a first end and a second end;
    a reservoir attached to said first end;
    a lid, said lid removably attached to said reservoir;
    a pointed tip, said tip having a first end and a second end, said tip tapered from said first end to said second end, said first end having a diameter;
    a manifold having an exterior surface and a first end and a second end, said first end of said manifold attached to said second end of said hollow conduit, said second end of said manifold being attached to said first end of said pointed tip, said manifold having a main passage formed therein in fluid communication with said hollow conduit so that said insecticide can flow from said hollow conduit through said main passage, said manifold having a plurality of holes formed between said exterior surface of said device and said main passage so that said insecticide can flow from said reservoir to said exterior surface through said conduit, said main passage and said plurality of holes when poured into said reservoir, said manifold having an annular channel formed in said exterior surface where said holes exit said manifold in order to prevent clogging of said holes when said device is pushed into soil.

2. The device as recited in claim 1, wherein said manifold has a diameter ranging from a minimum diameter to a maximum diameter and said holes exit said manifold at said minimum diameter.

3. The device as recited in claim 1, wherein said manifold has a diameter smaller than said diameter of said first end of said pointed tip.

4. The device as recited in claim 1, wherein said reservoir is dimensioned to hold approximately one quart or more of said insecticide.

5. The device as recited in claim 1, wherein said device is made of a washable plastic.

6. A device consisting of:

a quantity of a liquid insecticide;

a hollow conduit having a first end and a second end;

a reservoir attached to said first end, said insecticide in said reservoir and said reservoir in fluid communication with said hollow conduit;

a lid, said lid removably attached to said reservoir;

a pointed tip, said tip having a first end and a second end, said tip tapered from said first end to said second end, said first end having a diameter; and a manifold having an exterior surface and a first end and a second end, said first end of said manifold attached to said second end of said hollow conduit, said second end of said manifold being attached to said first end of said pointed tip, said manifold having a main passage formed therein in fluid communication with said hollow conduit so that said insecticide can flow from said hollow conduit through said main passage, said manifold having a plurality of lateral holes formed between said exterior surface of said device and said main passage so that said insecticide can flow from said reservoir through said conduit, said main passage and said plurality of lateral holes to said exterior surface when said insecticide is poured into said reservoir whereby said insecticide can be dispersed from said device, said manifold having a diameter at said holes, said diameter of said manifold being smaller than said diameter of said first end of said pointed tip.

7. The device as recited in claim 6, wherein said device is made of a washable plastic.

8. The device as recited in claim 6, wherein said manifold has an annular channel formed in said exterior surface at said holes.

9. The device as recited in claim 6, wherein said reservoir is dimensioned to hold approximately one quart or more of insecticide.

* * * * *